United States Patent
Dalebroux

(10) Patent No.: US 6,366,766 B1
(45) Date of Patent: Apr. 2, 2002

(54) INPUT PROTECTION CIRCUIT FOR A RADIO FREQUENCY

(75) Inventor: Donald J. Dalebroux, Vernonia, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/570,469

(22) Filed: May 12, 2000

(51) Int. Cl.[7] .................................................. H04B 1/16
(52) U.S. Cl. ........................ 455/217; 455/254; 330/298
(58) Field of Search .............................. 455/217, 235.1, 455/234.1, 250.1, 249.1, 254, 226.1, 226.2; 330/298

(56) References Cited

U.S. PATENT DOCUMENTS 6,272,327 B1 * 8/2001 Kurchuk et al. ............ 455/217

* cited by examiner

*Primary Examiner*—Doris H. To
(74) *Attorney, Agent, or Firm*—William K. Bucher

(57) ABSTRACT

An input protection circuit for an RF circuit has an input switch that decouples a RF input signal from the circuit path when the power level of the input signal is greater than a preselected threshold. An isolation device receives the input signal from the switch and couples a first portion of the signal to a switch control loop. The switch control loop includes a level detector that generates an output proportional to the average power of the input signal. The output of the detector is coupled to a comparator that also receives a reference signal for comparison with the detector output. The comparator generates an output signal that energizes the switch when the detector output exceeds the reference signal. The switch couples the input signal directly to ground or through a load to ground. A reset command resets the input switch to re-couple the input signal into the RF circuit. A power limiter, coupled to receive a second portion of the RF signal from the isolation device, prevents high power level, sort duration pulses of the input signal from passing further through the circuit. The isolation device prevents reflections from the power limiter from reflecting back into the level detector.

21 Claims, 5 Drawing Sheets

INPUT PROTECTION CIRCUIT FOR A RADIO FREQUENCY

BACKGROUND OF THE INVENTION

The present invention relates generally to radio frequency (RF) receivers and more particularly to an input protection circuit for a RF receiver for preventing damage to receiver components from high power level input signals.

Radio frequency (RF) receivers typically have sensitive front-end components such as mixers and preamplifiers that are susceptible to damage from high power level input signals. For example, an input mixer may be rated at 30 dBm which is equivalent to less than one watt of power. The output of power amplifiers in wireless communications base stations can have 30 watts of power going to the antenna. Measuring the output of the power amplifier using a measurement test instrument having an RF receiver requires the insertion of a attenuation pad between the power amplifier output port and the measurement instrument. The front end components of the measurement instrument will be destroyed without the use of the attenuation pad or some other way of protection circuit in front of the sensitive front end components.

One type of protection circuit is found in Advantest spectrum analyzers. The RF input to the spectrum analyzer is resistively coupled to an overload peak detector prior to being coupled to an input switch. The output of the peak detector is coupled to a relay control that causes the input switch to couple the signal through a resistive load to ground when the input signal exceeds one of two threshold levels. One level has a range of 0 dBm to +12 dBm with 0 dB of attenuation and a preamplifier connected to the input. The other level has a range of +20 dBm to +27 dBm with attenuation added into the circuit. A power limiter is connected before the preamplifier to limit the input power with no attenuation applied. The first mixer does not have a power limiter in place prior to its input. The power limiter in the lower threshold state can reflect power back into the detector which may cause an incorrect power detection and activation of the input switch.

Drawbacks to this particular protection circuit include the use of a peak detector that would have a tendency to be inaccurate for different peak to average ratio signals. Additionally, the peak detector is not isolated from the input signal which could be damaged if a high input power signal is accidentally applied to the input of the instrument. Further, only the preamplifier has a power limiter for protection and not the first mixer. Even though the input signal is attenuated prior to the mixer, a high input power signal accidentally applied to the input could destroy the mixer.

What is needed is an input protection circuit for an RF receiver that is independent of the receiver setting. The protection circuit should have a narrow threshold window that is not affected by limiter reflections or the peak to average ratio of the detected signals. Further, the protection circuit should be able to protect the sensitive front end components of the receiver from signals in excess of 50 watts.

SUMMARY OF THE INVENTION

Accordingly, the present invention is to an input protection circuit for a radio frequency receiver that has an input switch, preferably a latching relay, for selectively coupling a radio frequency (RF) input signal to the input of an isolation device. The isolation device has a first output coupled to a power limiter that receives a first portion of the RF signal. The RF signal is coupled through the power limiter to the radio frequency receiver. A second output of the isolation device is coupled to an RMS level detector that receives a second portion of the RF input signal. The RMS level detector generates an output level that is the same for radio frequency signals of equivalent power but differing peak-to-average power ratios. A comparator having a latch receives a reference signal and the output level from the RMS level detector and generates and latches an output signal when the output level is greater than the reference signal. The input switch receives the latched output signal and selectively couples the RF signal to the isolation device when the output level of the RMS level detector is less than the comparator reference signal and de-couples the radio frequency signal from the isolation device when the output level of the RMS level detector is greater than the comparator reference signal. A reset circuit is coupled to the comparator that unlatches the output signal from the comparator.

In the preferred embodiment of the invention, the isolation device is an broadband directional bridge and the RMS level detector is a broadband level detector. Alternately, the isolation device may be a narrow band directional coupler. The comparator latch is preferably implemented as a programmable logic device that includes a message generator that produces an overload condition exits message when the output level of the RMS level detector is greater than the comparator reference signal. The overload condition exists message is preferably a text message displayed on a display device. Alternately, the message may be an audio message generated from a speaker or a warning light indicator produced by an output drive signal. In the preferred embodiment, the radio frequency power limiter has a continuous wave radio frequency power rating of three watts. The latching relay has an armature coupled to receive the radio frequency signal, a first armature contact coupled to the isolation device and a second armature contact coupled to electrical ground or alternately to a resistive load.

In an alternate arrangement of the circuit elements of the input protection circuit for a radio frequency receiver, the input of the isolation device is coupled to receive the RF input signal. The RMS level detector is coupled to the first output of the isolation device and receives a first portion of the radio frequency input signal. The RMS level detector generates an output level that is the same for radio frequency signals of equivalent power but differing peak-to-average power ratios. The comparator receives a reference signal and the output level from the RMS level detector and generates an output signal when the output level is greater than the reference signal. The switch disposed after the isolation device and is coupled to receive a second portion of the radio frequency signal from the second output of the isolation device with the switch being driven by the comparator output signal to selectively couple the second portion of the radio frequency signal to the radio frequency receiver via a radio frequency power limiter when the output level of the RMS level detector is less than the comparator reference signal and de-couples the radio frequency signal from the radio frequency power limiter when the output level of the RMS level detector is greater than the comparator reference signal. The switch has an armature coupled to second output of the isolation device, a first armature contact coupled to the power limiter and a second armature contact coupled to electrical ground or alternately to a resistive load.

The objects, advantages and novel features of the present invention are apparent from the following detailed description when read in conjunction with appended claims and attached drawings.

DETAILED DESCRIPTION OF THE PREFERRED EMBODIMENT

Figure 1:
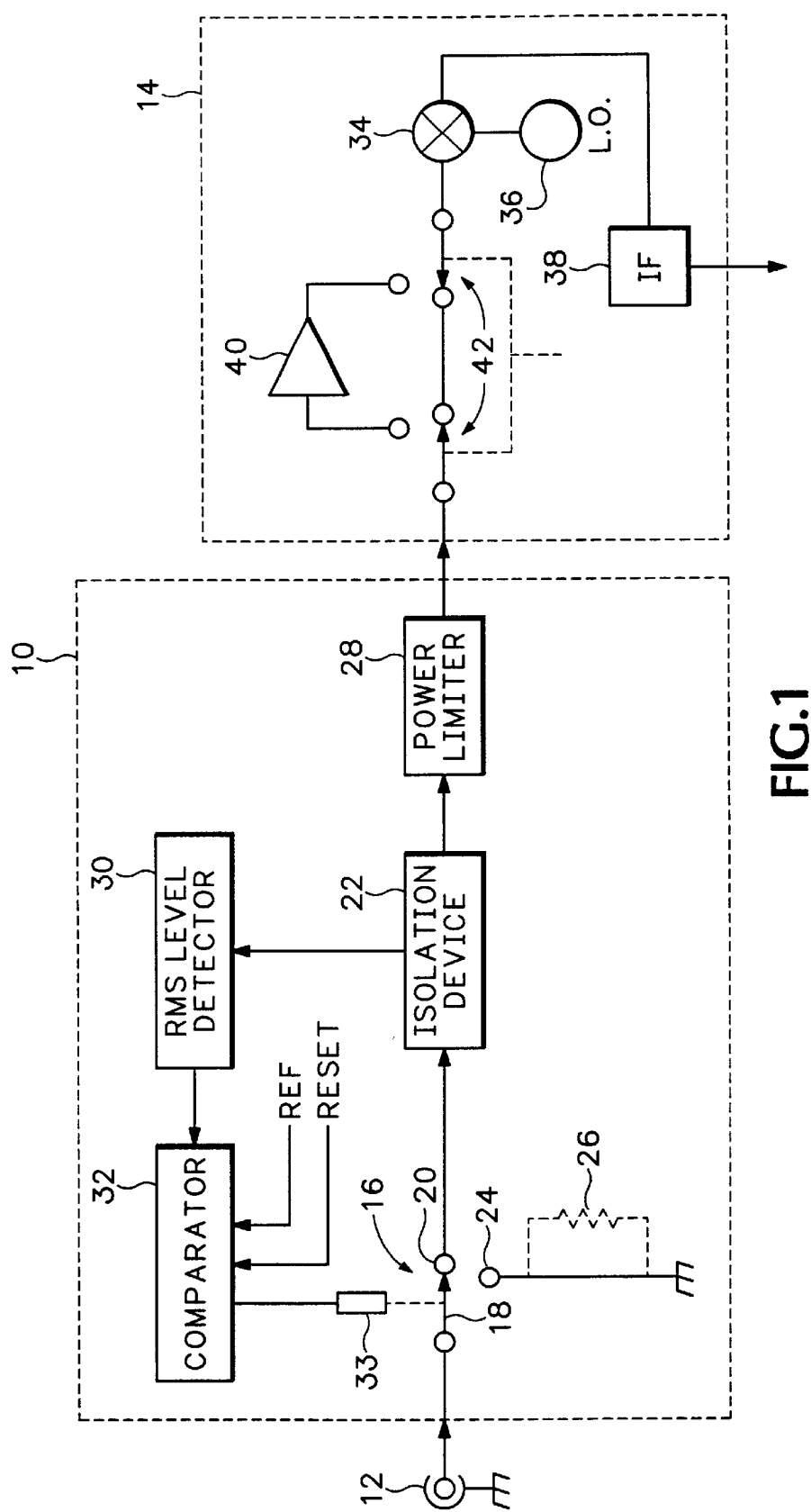
FIG. 1 is a representative block diagram of the input protection circuit according to the present invention.

FIG. 1 illustrates one embodiment of the input protection circuit 10 of the present invention coupled between a radio frequency (RF) input 12 and a RF receiver 14. The input protection circuit has a switch 16 with an armature 18 connected to the RF input 12. A first armature contact 20 is connected to an input of an isolation device 22 and a second armature contact 24 is connected to electrical ground. Alternately, the second armature contact 24 may be connected to ground through a resistive load as represented by the dashed resistor 26. The isolation device 22 has a first output coupled to a power limiter 28 and a second output coupled to a RMS level detector 30. The RMS level detector 30 has an output coupled to an input of comparator 32. The comparator 32 also receives a reference signal REF and a reset signal RESET. The comparator 32 generates an output signal that energies a coil or solenoid 33 in switch 16 to latch the switch armature 18 to the grounded armature contact 24. The output of the power limiter is coupled to the RF receiver 14. The simplified RF receiver has an input mixer 34 coupled to receiver an RF signal from the RF input 12 and a local oscillator signal from local oscillator 36. The output from the mixer 34 is an intermediate frequency (IF) signal coupled to IF circuitry 38. The gain of the RF receiver may be increased or decreased by including a preamplifier 40 in the RF receiver circuitry that is switched into and out of the receiver circuitry by switches 42.

The input protection circuit 10 is designed to be used in an RF measurement instrument that measures signal characteristics and power of an RF input signal, such a generated at a wireless communications base station transmitter. The RF signal may be tapped off at a number of locations in the transmitter circuitry including at the output of the power amplifier. As previously described, connecting the RF measurement to the output of the RF transmitter power amplifier without the use of an appropriate attenuation pad could destroy the sensitive front end circuitry of the measurement instrument. The input protection circuit 10 measures the input power of the incoming RF signal and shunts the signal to ground when the power level exceeds a predetermined level.

Switch armature 18 is initially connected to the grounded second armature contact 24 when the RF measurement instrument is turned on to protect the RF receiver from any input signal that may be present at the input 12. The switch armature 18 is connected to the first armature contact 20 on the initiation of a measurement test. The RF signal is coupled through the switch 16 to the isolation device 22. The isolation device 22 includes a tap that couples a portion of the RF signal to the RMS level detector 30 while coupling the majority of the RF signal to the power limiter 28. Because the protection circuit 10 has a finite time interval between the application of the RF input signal and the switching of switch 16, a single short pulse of the RF signal will propagate through the protection circuit 10. This pulse is limited by the power limiter 28 to levels that prevents damage to the sensitive components of the RF receiver 14. The power limiter 28 can withstand power levels well in excess of the continuous wave (CW) input rating of the limiter for the short duration of the RF signal pulse which gets by the input switch 16. Empirical data shows that limiters rated for three watts CW can withstand short duration RF signals of 50 watts or more applied to the input switch 16. The isolation device 22 is necessary for signal levels that are above the limiting region of the power limiter 28 and below the rated RF receiver input level. In this condition the power limiter will reflect the RF signal back to the input. Without the isolation device, the RMS level detector 30 will detect both the input RF signal and the reflected RF signal and thus give an erroneous indication of the input power.

The RMS level detector 30 receives the tapped RF signal from the isolation device and generates a DC output level proportional to the power of the RF signal. An RMS level detector is preferably used so that the output level of the detector is the same for signals of equivalent power but different peak to average power ratios. The DC output from the detector 30 is coupled to one input of the comparator 32. The reference signal REF is coupled to a second input of the comparator 32. When the DC output level of the detector 30 exceeds the reference signal REF, the comparator 32 generates an output signal that energizes the coil 33 and latches the switch 16 to connect the switch armature 18 to the armature contact 24. To de-energize the switch 16 and connect the switch armature 18 to the armature contact 20, a reset signal RESET is applied to the comparator.

Figure 2:
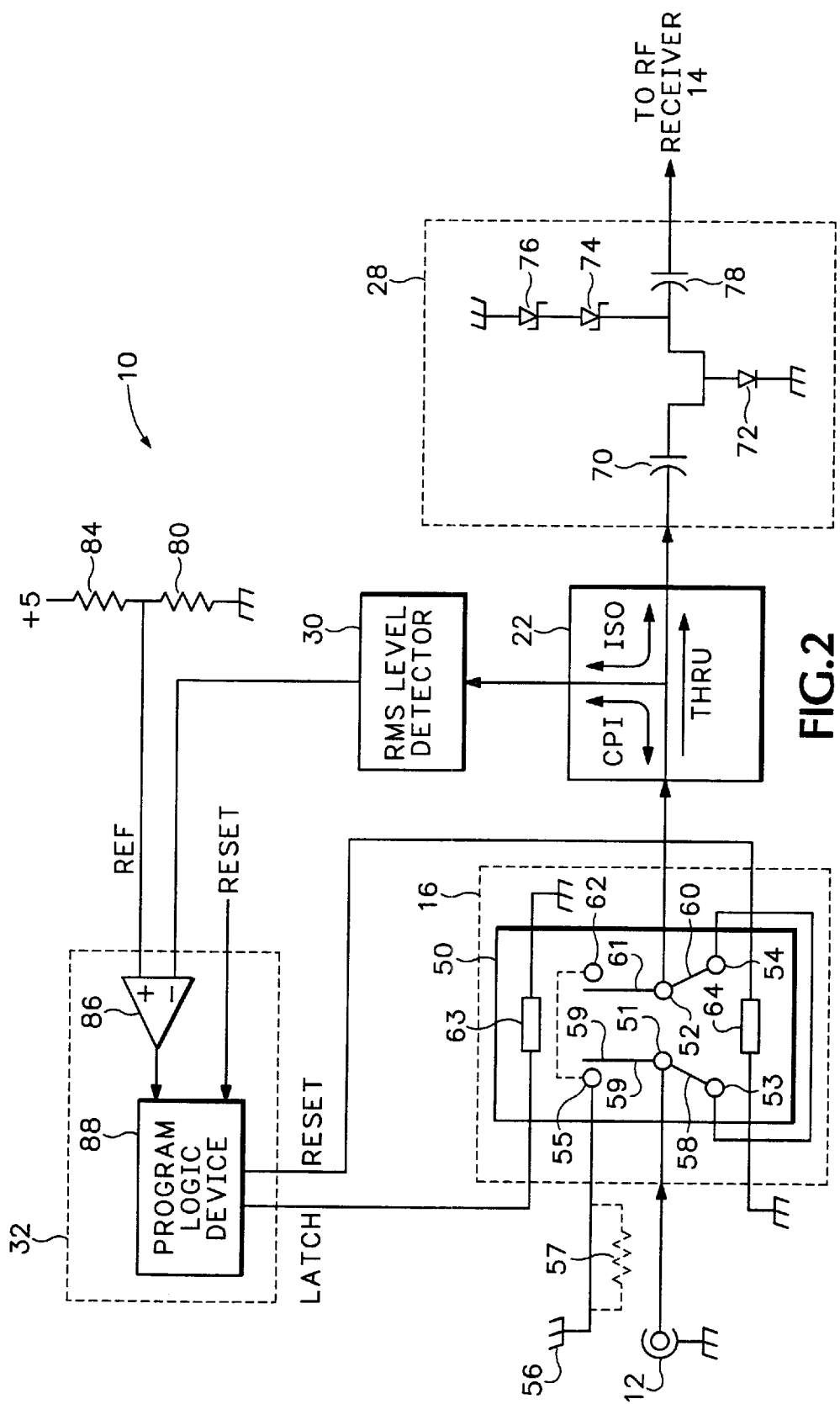
FIG. 2 is a simplified schematic drawing the preferred embodiment of the input protection circuit according to the present invention.

Referring to FIG. 2, there is a simplified schematic drawing the preferred embodiment of the input protection circuit 10 of the present invention. Like elements from FIG. 1 are labeled the same in FIG. 2. An RF input signal, such as generated by a wireless communications base station transmitter, is coupled to the radio frequency (RF) input 12 of an RF measurement instrument. The input protection switch 16 is implemented with a magnetic latching relay 50, such as manufactured and sold by Teledyne, Inc., Hawthorne, Calif. under part No. Series RF170. The input center contact 51 of the latching relay 50 is coupled to the RF input 12 and the output center conductor 52 is connected to the isolation device 22. A first input armature contact 53 is coupled to a corresponding first output armature contact 54. A second input armature contact 55 is coupled to electrical ground 56. Alternately, the second input electrical 55 contact may be connected to electrical ground through a load resistor 57. Armatures 58 and 59 respectively connect the input center contact 51 to the first input armature contact 53 and the second input armature contact 55. Armatures 60 and 61 respectively connect the output center contact 52 to the first output armature contact 54 and a second output armature contact 62. A LATCH signal from the comparator 32, in the form of a pulse, energizes coil 63 that produces a magnetic field opposing the holding flux of a permanent magnet to connect the input center contact 51 to the second input armature contact 55 through armature 59. The output center contact 52 is connected to the second output armature contact 62 through armature 61. At the same time armatures 58 and 60 respectively disengage from first input armature contact 53 and first output armature contact 54. A RESET signal pulse from the comparator 32 energizes coil 64 to connect the input center contact 51 to the first input armature contact 53 through armature 58 and the output center contact 52 to the first output armature contact 54 through armature 60. At the same time armatures 59 and 61 respectively disengage from second input armature contact 55 and second output armature contact 62. The isolation device 22 receives the RF signal from the latching relay 50 at an input port. In the preferred embodiment, the isolation device 22 is an asymmetric directional bridge having a nominal 1 dB of attenuation in the thru-channel to a first output port and a nominal 20 dB of attenuation in the tapped output port. The reverse isolation from the thru-channel output port to the tapped output port is a nominal 35 dB. The RF signal at the thru-channel output port is coupled to the power limiter 28.

In the preferred embodiment, the power limiter 28 is implemented using discrete PIN and Schottky diodes and blocking capacitors. The RF signal is coupled through blocking capacitor 70 to the anode of PIN diode 72 that has its cathode coupled to electrical ground. The anode of PIN diode 72 is also connected to the cathode of one of a pair of series connected Schottky diodes 74 and 76 that has the anode of diode 76 connected to electrical ground. The anode/cathode junction of PIN diode 72 and Schottky diode 74 is coupled to another blocking capacitor 78. The PIN diode 72 is a specially packaged low inductance diode manufactured and sold by Hewlett-Packard Co., Palo Alto, Calif. under part No. HSMP4820. The Schottky diodes 74, 76 are low capacitance devices, manufactured and sold by Metallics Corp., Sunnyvale, Calif. under part No. SCHOT. The low inductance leads of the PIN diode along with the low capacitance Schottky diodes and the blocking capacitors 70 and 78 produce a broadband low pass response filter network that is self biased by the Schottky diodes 74, 76.

The RF signal at the tapped output port of the isolation device 22 has a range of approximately 20 dB and is coupled to the RMS level detector 30. In the preferred embodiment, the RMS level detector 30 is implemented using a True RMS Detector, manufactured and sold by Analog Devices Inc., Norwood Mass. under part No. AD8361. The output of the level detector 30 is a DC voltage that varies as a function of the equivalent power of the RF signal. The maximum output of the level detector 30 is near the positive rail of the device, which is approximately 4.8 volts. The DC output signal of the RMS level detector 30 is input to the comparator 32 having a operational amplifier, such as manufactured and sold by National Semiconductor Corp., Arlington, Tex. under part No. LM393, configured as a comparator circuit 86, and a programmable logic device 88, such as manufactured and sold by Xilinx, Inc., San Jose, Calif. under part No. XCS10XLA. The DC output signal from the RMS level detector 30 is applied to the inverting input node of the comparator circuit 86. The REF signal is generated by a voltage divider network consisting of resistors 80 and 82 and applied to the non-inverting input node of the comparator 86. In the preferred embodiment of the invention, the REF signal has a voltage of approximately 3 VDC. The comparator 86 generates an output signal when the DC output signal from the RMS level detector 30 is greater than the REF signal. The output of the comparator 86 is coupled to an input of the programmable logic device 86, which generates a LATCH output signal in response to the comparator circuit 86 output signal. The LATCH output signal energizes coil 63 of the latching relay 50 to latch the RF input 12 to electrical ground through center input contact 50, armature 59 and second input armature contact 60. At the same time the first input armature contact 53 is disconnected from the center input contact 52 and the first output armature contact 54 is disconnected from the center output contact 52. A manually initiated RESET command signal is generated and applied to the programmable logic device 88 in response to a user initiated command. A RESET output signal is generated by the programmable logic device 88 and applied to coil 64 of the latching relay 50 to latch the RF input 12 to the isolation device 22 through center input contact 50, armatures 58 and 60, first input and output armature contacts 53 and 54 and center output contact 52. At the same time the first input armature contact 55 is disconnected from the center input contact 51 and the second output armature contact 62 is disconnected from the center output contact 52.

Figure 3:
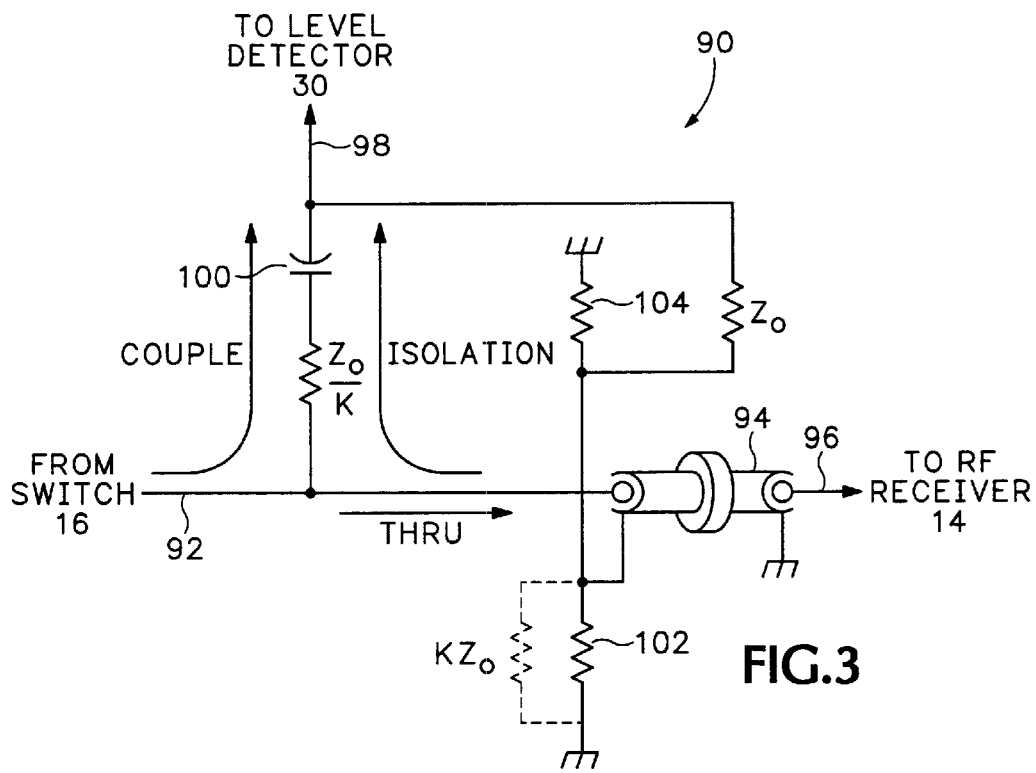
FIG. 3 is a schematic representation of the isolation device implemented as asymmetric bridge in the input protection circuit according to the present invention.

Referring to FIG. 3, there is shown a schematic representation of the isolation device 22 implemented as asymmetric bridge 90. The asymmetric bridge 90 is constructed using discrete component connected together using 50 ohm microstrip transmission lines. The input port 92 of the asymmetric bridge 90 is coupled to a 50 ohm coaxial transmission line element 94 having a ferrite toroid mounted thereon to form a balun that electrically isolates the grounded end of the coaxial element outer shield conductor from the other end of the shield conductor. The grounded end of the balun 94 is the first output port 96 of the bridge 90. Resistor $Z_0$ is coupled between the ungrounded outer shield conductor of the balun 94 and the tapped second output port 98 of the bridge 90 and has a resistance value equivalent to characteristic impedances of the input port 92. Resistor $Z_0/k$ is coupled to the center conductor input of the balun 94 and through blocking capacitor 100 to the tapped second output port 98. One end of resistor $kZ_0$, implemented as parallel resistors 102, 104, is coupled to the non-grounded end of the outer shield conductor of the balun 94 with the other end connected to the circuit or electrical ground. The values of resistors $kZ_0$ and $Z_0/k$ are such that: $kZ_0 \times Z_0/k = Z_0^2$. In the preferred embodiment of the invention, the microstrip transmission lines have a characteristic impedance of 50 ohms, $Z_0$ has a value of 49.9 ohms, resistors 102 and 104 have values of 10 ohms, resistor $Z_0/k$ has a value of 499 ohms and capacitor 100 has a value of 0.01 $\mu F$.

Figure 4:
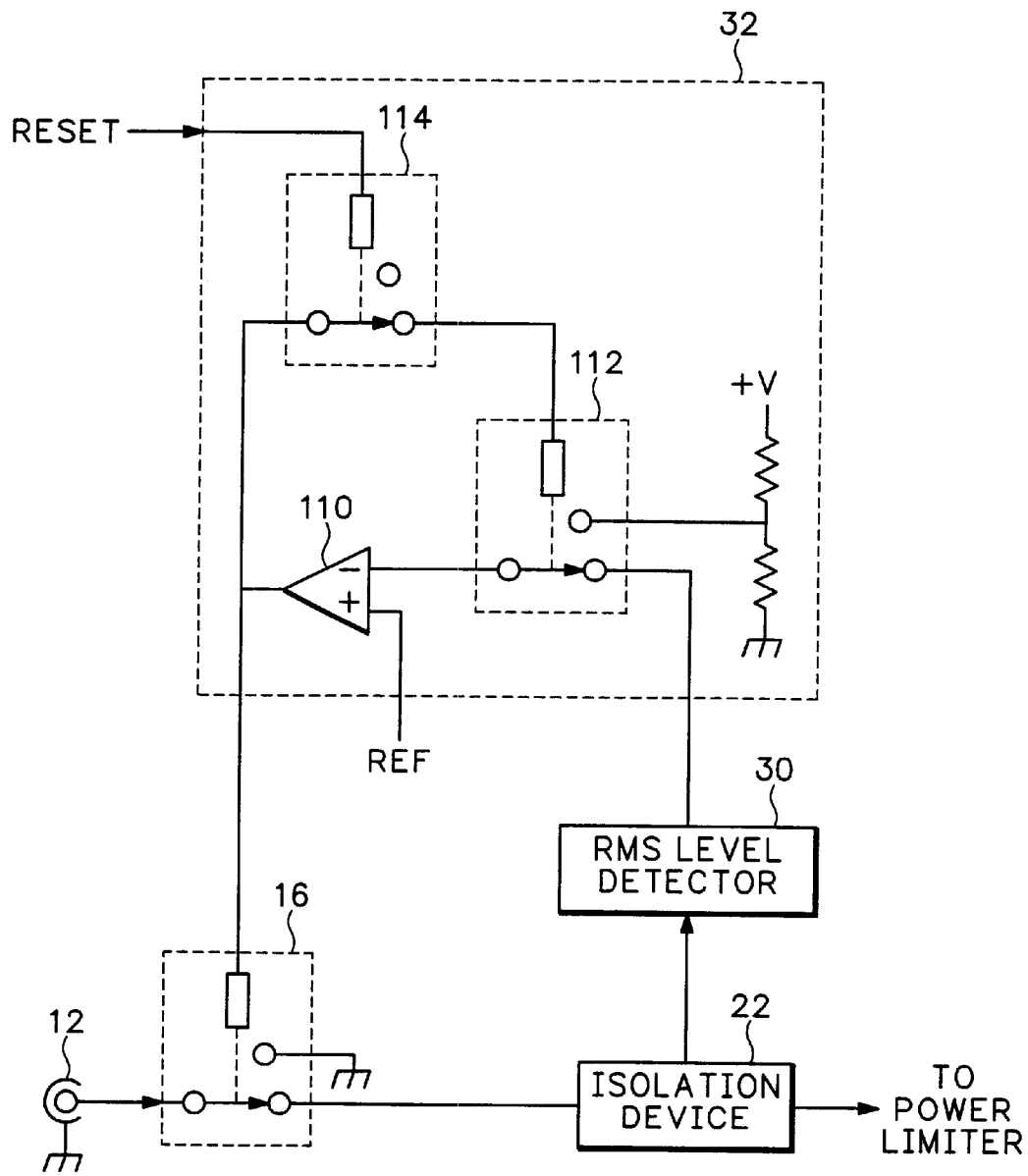
FIG. 4 is an alternative embodiment of the comparator 32 in the input protection circuit according to the present invention.

Referring to FIG. 4, there is shown an alternative embodiment of the comparator 32 for latching switch 16. Like elements from FIG. 1 are labeled the same in FIG. 4. The RF signal is coupled through RF input 12 and switch 16 to the isolation device 22. The tapped output from the isolation device 22 is coupled to the RMS level detector 30. The output of the RMS level detector 30 is coupled through switch 112 to the inverting input of the operational amplifier 110, configured as a comparator. The non-inverting input is coupled to the reference signal REF. The output of the comparator 110 is coupled to a coil or solenoid in switches 16. The comparator output is also coupled through reset switch 114 to a coil or solenoid of switch 112.

The application of a high power RF signal at input 12 causes the RMS level detector to generate an output that is greater than the reference signal REF threshold. The comparator 110 generates an output signal that energizes the coil of switch 16 causing the RF signal to be disconnected from the isolation device and the RF input to be connected to ground. The comparator output also energizes the coil of switch 112 causing the inverting input of the comparator 112 to be coupled to a bias voltage level that is higher than the reference signal REF. The bias voltage level may be generated by a voltage divider network consisting of series connected resistors 116 and 188 connected between a voltage source +V and electrical ground. The bias voltage level maintains the output voltage from the comparator 110 even when the high power RF signal is removed from the RF input 12. The manually initiated reset signal RESET energizes the coil of switch 114 causing the output of the comparator 110 to be disconnected from the coil of switch 112. Switch 112 reverts to its original state causing the bias voltage level to be disconnected from the inverting input of the comparator 110 and connecting the input the RMS level detector 30. With no RF signal applied to the RMS level detector 30, the output of the detector is less than the reference signal REF resulting in no output signal from the comparator 110. The loss of the comparator output signal de-energizes the coil of switch 16 causing the RF input to be reconnected to the isolation device.

Figure 5:
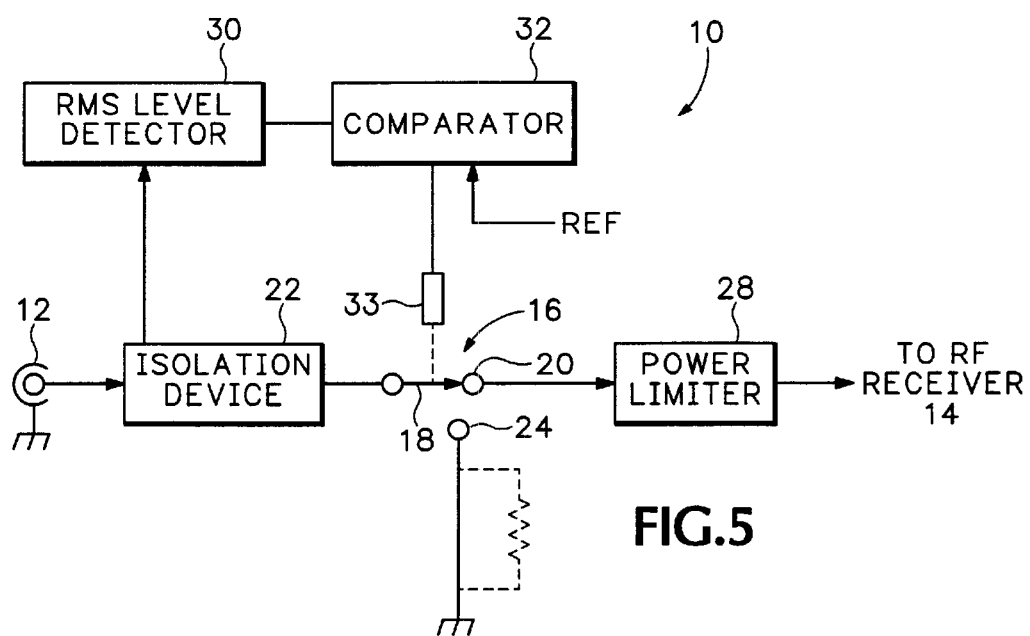
FIG. 5 is an alternative embodiment of the input protection circuit according to the present invention.

Referring to FIG. 5, there is shown an alternative embodiment of the input protection circuit 10 of the present invention. Like elements from FIG. 1 are labeled the same in FIG. 4. The RF input 12 is connected to the input port of the isolation device 22 instead of the switch 16 as in FIG. 1. Because switch 16 is disposed after the isolation device 22 in this configuration, the isolation device 22 needs to have a power rating sufficient to handle a relatively high power RF input signal, such as 50 watts, at the input port 12. The first output port of the isolation device 22 is coupled to the power limiter 28 through armature 18 and first armature contact 20 of switch 16. The second armature contact 24 is connected to electrical ground, either directly or through a resistive load as represented by the dashed resistor 26. The second output port of the isolation device is coupled to the RMS level detector 30. The output of the RMS level detector 30 is input to the comparator 32, which also receives the reference signal REF. The comparator 32 is implemented using an operational amplifier configured as a comparator as previously described. Because the control loop for switch 16 is prior to the switch, the protection circuit 10 is implemented without the reset signal RESET.

The RF signal is input through the RF input 12 to the isolation device 22. The tapped RF signal is coupled to the RMS level detector 30 that generates a DC voltage output signal proportional to the power of the RF signal. The DC output signal is coupled to the inverting input of the comparator 32 and is compared to the reference signal REF that is coupled to the non-inverting input of the comparator 32. A DC output signal greater than the reference signal REF produces an output signal from the comparator 32 that energizes the coil or solenoid of switch 16 causing the switch to decouple the RF signal from the power limiter 28 and couple the RF signal to ground. When the RMS level detector 30 produces an DC output signal that is less than the reference signal REF, due to the RF signal power having a level that does not damage the RF receiver 14 components, the comparator 32 discontinues generating the output signal which de-energizes the coil of switch 16 causing the RF signal to be re-coupled to the power limiter 28.

Figure 6:
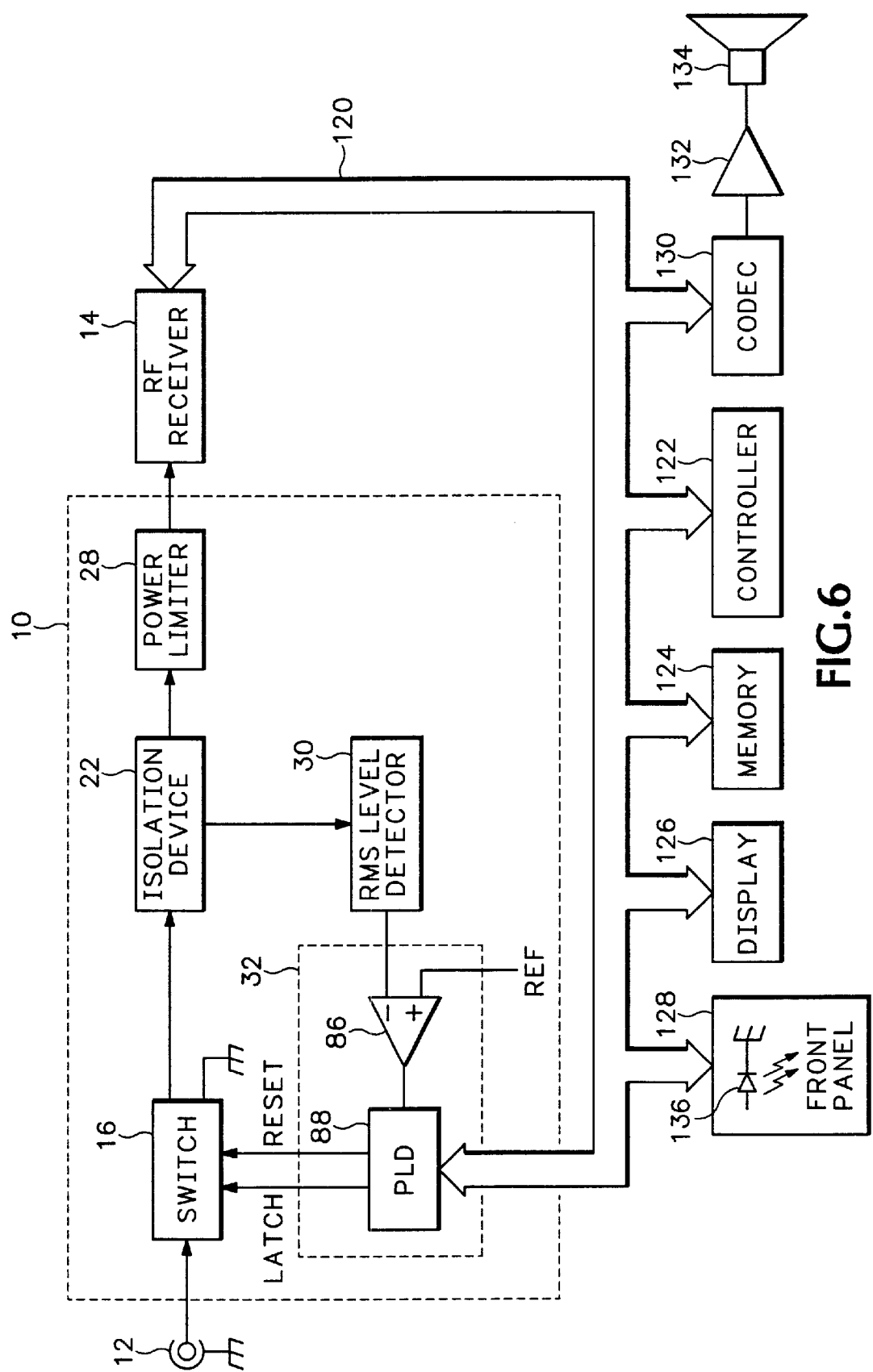
FIG. 6 is a representative block diagram of a RF measurement instrument incorporating the input protection circuit according to the present invention.

Referring to FIG. 6, there is shown a representative block diagram of a RF measurement instrument incorporating the input protection circuit 10 of the present invention. Like elements from the previous figures are labeled the same in FIG. 6. A RF signal under test is coupled to the protection circuit 10 via the RF input 12. The output of the protection circuit 10 is coupled to the RF receiver 14 that includes an analog-to-digital (A/D) converter for converting the RF signal to digital data values. The receiver 14 may also include a digital signal processor (DSP) that controls the digitization process and performs initial processing of the digital data. The digital data is coupled via the address and control bus 120 to a controller 122. The address and data bus 120 is also coupled to memory 124 that contains both RAM and ROM memory. A display device 126, such as a liquid crystal display, cathode-ray-tube or the like is also coupled to the bus 120. Front panel controls 128, such as knobs, push-buttons, and the like are also coupled to the bus 120. A codec 130 may be also be coupled to the bus for providing an audio output from the instrument. An amplifier 132 receives the output from the codec 130 and amplifies the codec output and applies the amplified signal to a speaker 134. The program logic device 88 (PLD) of the input protection circuit 10 is also coupled to the address and control bus 120.

In the below described operation of the input protection switch 10, the switch 16 is implemented as the magnetic latch relay previously described. The RF input signal is coupled through switch 16 to the isolation device 22 having its tapped output coupled to the RMS level detector 30. The thru-channel output is coupled to the power limiter 28. The tapped output of the isolation device 22 is coupled to the RMS level detector that generated a DC output proportional to the average power of the tapped RF signal. The DC output is coupled to the inverting input of comparator 86 which receives the reference signal REF at the non-inverting input. The comparator 86 generates an output signal when the detector output signal exceeds the reference signal REF. The output of the comparator 86 is coupled to the PLD 88 that generates a latch pulse to the switch 16 to coupled the RF input to ground. The PLD also generates a overload condition exists control signal to the controller 122. The controller 122, operating under program control from programs stored in ROM memory 124 interprets the control signal and generates a overload condition exists message that is displayed on display device 126. Alternately, the controller 122 may interpret the overload condition exist control signal and generate an overload condition exists message that is passed to the codec 130. The codec processes the message and generates an output signal that is amplified by amplifier 132 and coupled to the speaker 134 as an audio message. A further alternative is the controller 122 interprets the overload condition exist message and generates an output signal at drives a warning light, such as an LED 136 on the front panel 128 of the instrument.

To rest the switch 16 to couple the RF signal to the isolation device 22, a manually controlled reset button on the front panel 128 is activated by an operator. The reset button may also be implemented as a touch screen elements of a touch screen display. Activating the reset button initiates a command to the controller 122 that generates a rest command that is coupled to the PLD 88. The PLD 88 generates the reset signal that latches the relay switch into the position to couple the RF signal to the receiver 14.

The above operation of the input protection circuit 10 has been described in relationship to a controller 122 operating under program control. The input protection circuit 10 may function independently of the controller 122 to generate the overload condition exists messages. In such an alternative, the PLD generates the overload condition exists message, which is passed to a display controller for display on the display device 126. Additionally, the PLD may be connected directly to the codec 130 with the PLD generating the audio overload condition exist audio message. Still further, the PLD may be connected directly to the warning light with the PLD generating an output signal for driving the light.

An input protection circuit has been described having an input switch for selectively coupling and de-coupling an input signal from power sensitive circuitry. The protection circuit has an isolation device that a first portion of the input signal to a power limiter and a second portion to a RMS level detector. The level detector generates an output signal proportional to the average power of the input signal. The output signal is coupled to one input of a comparator that receives a second reference signal REF. The comparator generates an output signal when the level detector output signal is greater than the reference signal REF. The output of the comparator energizes and de-energizes a coil or solenoid in switch 16 to couple and de-couple the RF signal from the rest of the circuit. In the preferred embodiment of the invention, the switch is a magnetic latching relay driven by a programmable logic device (PLD) that receives the comparator input and a reset signal RESET. The PLD generates LATCH and RESET pulses that energize respective latch and rest coils in the magnetic latching relay. In an alternate embodiment of the input protection circuit, the isolation device receives the RF input signal and couples the signal through the switch 16 to the power limiter. The RMS level detector and comparator, including the programmable logic device, perform the same function as previously described to energize the switch to couple and decouple the RF input signal from the rest of the circuit. In such a configuration, a conventional switch may be used and driven directly by the comparator output without the need for the reset signal RESET.

Thus, the input protection circuit usable in an RF measurement instrument has been described. Whereas many alteration and modifications to the present invention will be comprehended by a person skilled in the art after having read the foregoing description, it is to be understood that the particular embodiments shown and described by way of illustration are in no way intended to be considered limiting. References to details of particular embodiments are not intended to limit the scope of the appended claims.

What is claimed is:

1. An input protection circuit for a radio frequency receiver comprising:
    an isolation device having an input receiving a radio frequency input signal and first and second outputs;
    a radio frequency power limiter coupled to the first output of the isolation device receiving a first portion of the radio frequency signal and coupling the first portion of the radio frequency signal to the radio frequency receiver;
    an RMS level detector coupled to the second output of the isolation device receiving a second portion of the radio frequency input signal and generating an output level that is the same for radio frequency signals of equivalent power but differing peak-to-average power ratios;
    a comparator having a latch receiving a reference signal and the output level from the RMS level detector for generating and latching an output signal when the output level is greater than the reference signal;
    a switch disposed before the isolation device input receiving the latched output signal that selectively couples the radio frequency signal to the isolation device when the output level of the RMS level detector is less than the comparator reference signal and de-couples the radio frequency signal from the isolation device when the output level of the RMS level detector is greater than the comparator reference signal; and
    a reset circuit coupled to the comparator that unlatches the output signal from the comparator.

2. The input protection circuit for the radio frequency receiver as recited in claim 1 wherein the isolation device comprises a broadband directional bridge.

3. The input protection circuit for the radio frequency receiver as recited in claim 2 wherein the RMS level detector comprises broadband RMS level detector.

4. The input protection circuit for the radio frequency receiver as recited in claim 1 wherein the isolation device comprises a narrow band directional coupler.

5. The input protection circuit for the radio frequency receiver as recited in claim 1 wherein the comparator latch comprises a programmed logic device.

6. The input protection circuit for the radio frequency receiver as recited in claim 5 wherein the programmed logic device further comprises a message generator that produces an overload condition exists message when the output level of the RMS level detector is greater than the comparator reference signal.

7. The input protection circuit for the radio frequency receiver as recited in claim 6 wherein message generator produces the overload condition exists message for displaying on a display device.

8. The input protection circuit for the radio frequency receiver as recited in claim 6 wherein message generator produces the overload condition exists message as an audio signal for a speaker.

9. The input protection circuit for the radio frequency receiver as recited in claim 6 wherein the message generator produces an output signal for driving a warning light indicator.

10. The input protection circuit for a radio frequency receiver as recited in claim 1 wherein the radio frequency power limiter has a continuous wave radio frequency power rating of three watts.

11. The input protection circuit for a radio frequency receiver as recited in claim 1 wherein the switch comprises a latching relay.

12. The input protection circuit for a radio frequency receiver as recited in claim 11 wherein the latching relay has an armature coupled to receive the radio frequency signal, a first armature contact coupled to the isolation device and a second armature contact coupled to electrical ground.

13. The input protection circuit for a radio frequency receiver as recited in claim 11 wherein the latching relay has an armature coupled to receive the radio frequency signal, a first armature contact coupled to the isolation device and a second armature contact coupled to a resistive load.

14. A input protection circuit for a radio frequency receiver comprising:
    an isolation device having an input receiving a radio frequency input signal and first and second outputs;
    an RMS level detector coupled to the first output of the isolation device receiving a first portion of the radio frequency input signal and generating an output level that is the same for radio frequency signals of equivalent power but differing peak-to-average power ratios;
    a comparator receiving a reference signal and the output level from the RMS level detector and generating an output signal when the output level is greater than the reference signal;
    a switch disposed after the isolation device and coupled to receive a second portion of the radio frequency signal from the second output of the isolation device with the switch being driven by the comparator output signal to selectively couple the second portion of the radio frequency signal to the radio frequency receiver via a radio frequency power limiter when the output level of the RMS level detector is less than the comparator reference signal and de-couples the radio frequency signal from the radio frequency power limiter when the output level of the RMS level detector is greater than the comparator reference signal.

15. The input protection circuit for the radio frequency receiver as recited in claim 14 wherein the isolation device comprises a broadband directional bridge.

16. The input protection circuit for the radio frequency receiver as recited in claim 15 wherein the RMS level detector comprises broadband RMS level detector.

17. The input protection circuit for the radio frequency receiver as recited in claim 14 wherein the isolation device comprises a narrow band directional coupler.

18. The input protection circuit for the radio frequency receiver as recited in claim 14 further comprising a means for developing an output signal for driving a warning light when an overload condition exists.

19. The input protection circuit for a radio frequency receiver as recited in claim 14 wherein the radio frequency power limiter has a continuous wave radio frequency power rating of three watts.

20. The input protection circuit for a radio frequency receiver as recited in claim 14 wherein the switch has an armature coupled to second output of the isolation device, a first armature contact coupled to the power limiter and a second armature contact coupled to electrical ground.

21. The input protection circuit for a radio frequency receiver as recited in claim 14 wherein the switch has an armature coupled to second output of the isolation device, a first armature contact coupled to the power limiter and a second armature contact coupled to a resistive load.

* * * * *